Sept. 9, 1958 J. G. JACKSON 2,851,538
PANELBOARD
Filed Aug. 17, 1950 2 Sheets-Sheet 1

INVENTOR.
John G. Jackson.
BY Myron J. Seibold
ATTORNEY.

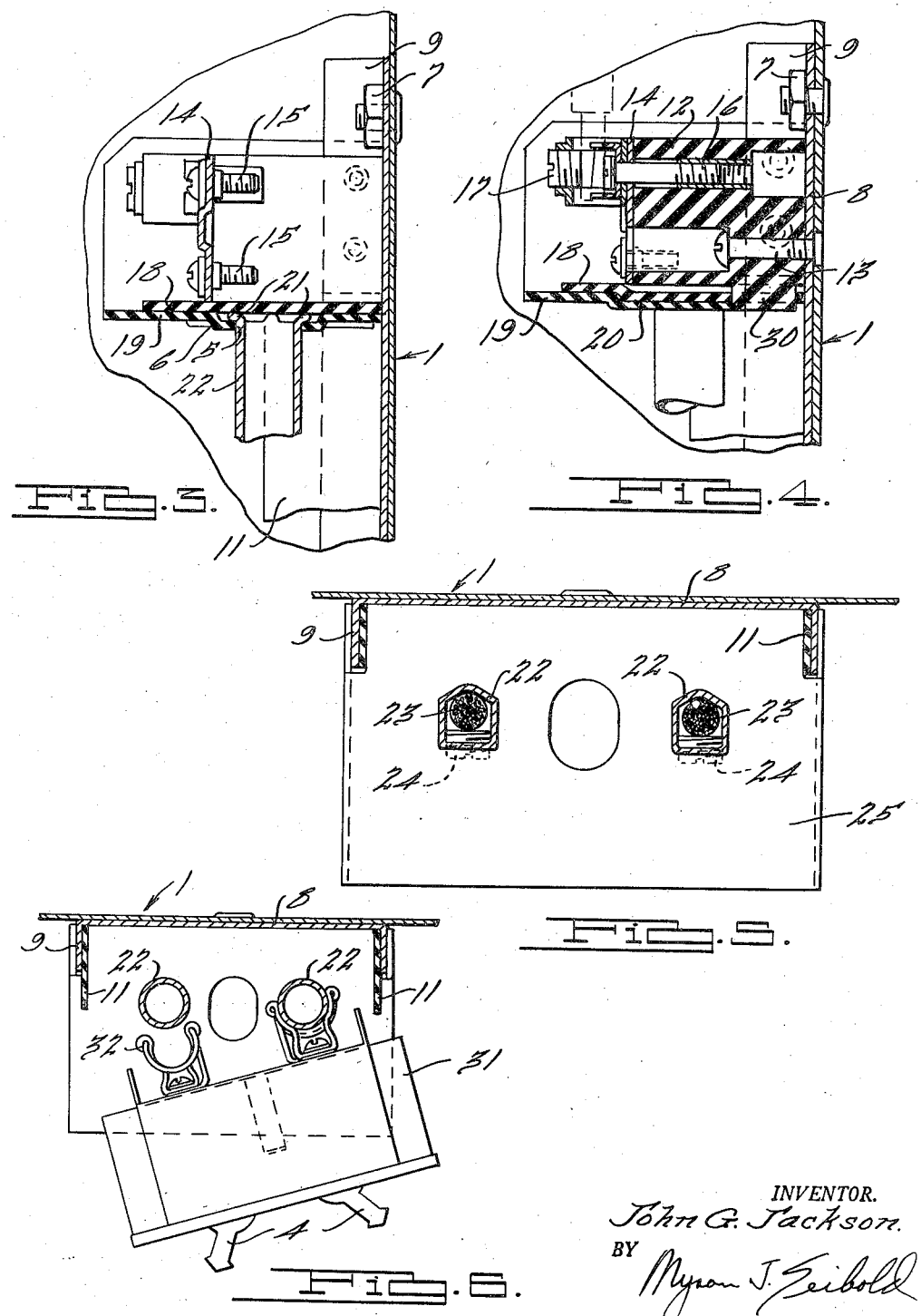

United States Patent Office 2,851,538
Patented Sept. 9, 1958

2,851,538
PANELBOARD

John G. Jackson, Detroit, Mich., assignor to Square D Company, Detroit, Mich., a corporation of Michigan Application August 17, 1950, Serial No. 180,044

6 Claims. (Cl. 174—99)

This invention relates to an electrical panelboard, panelette or load center employing a plurality of controlling units for electrical circuits, and more particularly to an electrical panelboard of this type employing elongated bus conductors to which the units are attached.

One object of the invention is a provision of a panelboard in which the bus conductor's supports and insulators are comprised of formed insulating sheets which both mount the conductors and insulate them from adjacent parts.

Another object of the invention is the provision of a panelboard in accordance with the preceding object in which the insulating sheets mounting the bus conductors are of thermalsetting, phenolic impregnated cloth which in partially cured sheets is heated until soft and then formed into the desired shapes for mounting and insulating the conductors.

A further object of the invention is the provision of a panelboard of a type having elongated bus conductors which is in accordance with the preceding objects and in which the ends of the bus conductors are shaped to cooperate with insulating walls which maintain the conductors in position.

An additional object of the invention is the provision of a panelboard in accordance with the preceding objects in which one end of the bus conductor is shaped to integrally form the stationary portion of a solderless connector unit.

Other objects and features of the invention will be readily apparent to those skilled in the art from the specification and appended drawings illustrating certain preferred embodiments in which:

Figure 3 is a sectional view along the lines III—III of Figure 1.

Figure 4 is a sectional view along the lines IV—IV of Figure 1.

Figure 5 is a sectional view along the lines V—V of Figure 1.

Figure 6 is a detail view of the circuit controlling unit, used with the panelboard of the present invention, the panelboard being shown with the cover removed and box broken away, and in which the controlling unit is shown in outwardly swiveled position where access to circuit terminals is facilitated.

Figure 1:
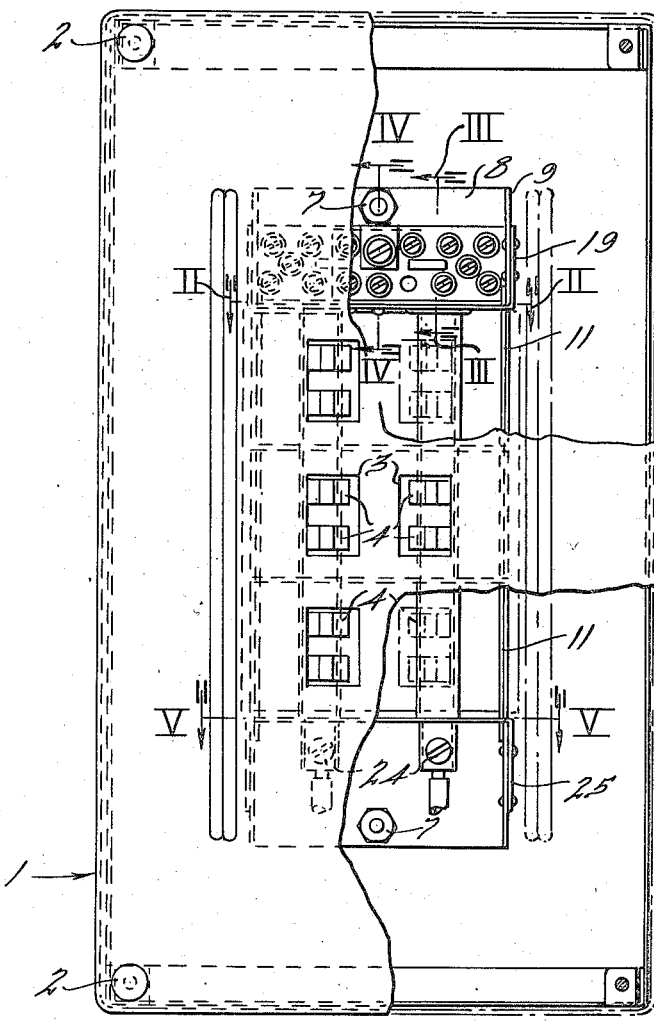
Figure 1 is a front elevational view of a panelboard in accordance with the present invention, with portions of the cover broken away to show the internal structure.
Figure 2:
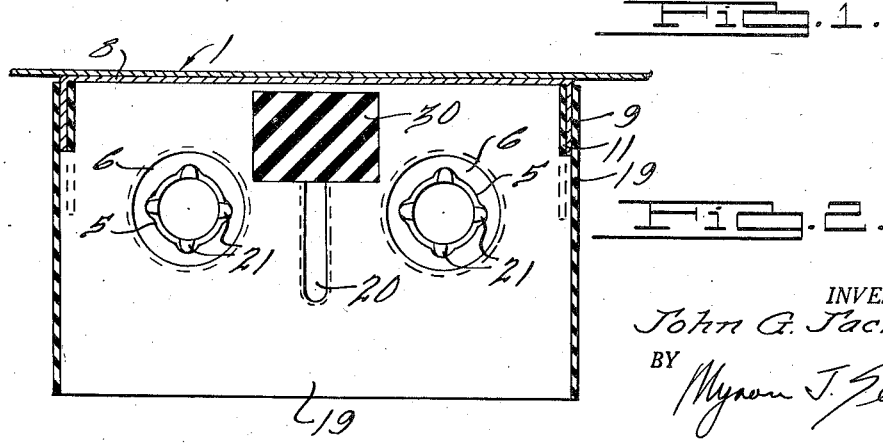
Figure 2 is a sectional view along the lines II—II of Figure 1.

The panelboard, according to the present invention, comprises a sheet metal box 1 having a metal cover normally attached thereto by studs 2, the cover having a plurality of openings 3, through which operating handles 4 of circuit controlling units 31 project. Mounted upon the back surface of the box by studs 7 is a metal plate 8 having upstanding edges 9, which extend vertically and at right angles to the bottom of the box. Attached to the upstanding edges 9, as by riveting, is a U-shaped insulating member 19 preferably formed of thermalsetting, phenolic impregnated cloth of sheet-like form. This material is originally processed in flat sheet form with the phenolic partially cured so that it may be heated to softness and then formed to the desired shape.

The bight of the U-shaped piece 19 extends horizontally and at right angles to the plate 8, and is provided with a pair of spaced apertures 5 surrounded by embossed rings 6. Passing through apertures 5 are a pair of tubular bus conductors 22 having enlarged perimeter ends 21 which are distorted by any well known forming method, as by extruding, spinning or upsetting so that the ends are received within the recesses provided by embossed rings 6 to prevent downward movement of conductors 22.

Against the upper surface of the bight of insulating member 19 is placed an insulating sheet 18 of similar material which prevents upward movement of bus conductors 22. Sheet 18 is maintained in place by an insulating block 12 which is secured to the plate 8 by a screw 13, the block 12 carrying a plate of conducting material 14, provided with a plurality of terminal screws 15 which serve to permit the attachment of neutral conductors. The conducting plate 14 is secured to the insulating block 12 by a screw 16, which also serves to fixedly mount a solderless connector 17 to the conducting plate 14.

Insulating members 19 and 18 are indexed by the complementary nesting ribs 20, and the insulating block 12 is provided with an extension 30 extending through complementary openings in the members 18 and 19.

The lower ends of the bus conductors 22 are formed into the non-circular shape illustrated in Figure 5, thereby integrally forming the stationary parts of solderless connector units, and adapted to receive the ends of electrical conductors 23, which carry electrical energy to the panelboard.

As shown in Figures 1 and 5, the outward facing flat portion of the formed end of each of the bus conductors 22 is provided with a threaded opening through which a screw 24 extends to apply pressure to an inserted end of an electrical conductor 23, to assure a secure electrical and mechanical connection between the ends of the supply conductor 23 and the bus conductor 22.

Cooperating with these ends of the bus conductors is an inverted, second generally U-shaped insulating member 25 formed as was member 19 and which has apertures through which the shaped ends of the bus conductors project, the apertures closely conforming to the shaped ends of the bus conductors extending therethrough. The member 25 is fixedly mounted to the upstanding edges 9 as by riveting and both supports and prevents any rotational movement of the bus conductors. While the applicant has chosen the particular shape shown in Figure 5, it is obvious that any non-circular shape may be employed.

Against the inner surfaces of the upstanding edges 9, so as to be disposed between each adjacent edge and the adjacent bus conductor, are insulating strips 11 which may be secured as shown by having end portions extending between insulating members 19 (and 25) and the edges 9.

In Figure 6 there is shown one of the circuit controlling instrumentalities 31, which in and of itself forms no part of the present invention, and which is provided with resilient clips 32 by which the units are mounted upon the bus conductors 22, as more clearly shown and claimed in the patent of John G. Jackson, 2,440,824, dated May 4, 1948, the position of Figure 6 being one of assembly, disassembly, or a temporary position to provide access to the terminals at the ends of the unit.

Insulating members 19 and 25, being of sheet form, will have a certain degree of flexibility to facilitate the mounting of units 31 on the bus bars in the cases where variations in height of the units or inexact positioning will require a certain "give" to the insulating support to permit the unit to be snapped into position, the member 19 being flexible upwardly, and the member 25 flexible downwardly for this purpose to accommodate the units.

It should be noted that the combination of the insulating members 18, 19 and 25 serve to prevent both rotation and translation of the bus conductors 22, the members 18 and 19 serving to prevent any lengthwise movement of the bus conductors by cooperating with the enlarged ends 21 thereof, and the member 25 preventing rotational movement of the bus conductors by snugly engaging the non-circularly shaped ends. It will be seen, therefore, that in the device of the present invention no direct fastening devices need be employed to retain the bus conductors in position, this arrangement providing for ease, simplicity, and economy in the manufacture of the device.

It is obvious that this device also provides for great ease in the connection of the panelboard to conductors carrying current to it, no additional solderless connector units or any other fastening means being necessary for the connection of the electrical conductors 23 to the bus conductors 22, the bus conductors themselves serving in that capacity.

Where herein the term "panelboard" is used, it is to be understood to include panelettes, load centers and similar assemblages of control instrumentalities.

While certain preferred embodiments of the invention have been specifically disclosed, it is understood that the invention is not limited thereto, as many variations will be readily apparent to those skilled in the art, and the invention is to be given its broadest interpretation within the terms of the following claims:

What is claimed is:

1. In a device for facilitating electrical connection of circuit controlling units to a source of electrical energy, an enclosure, a plurality of elongated tubular bus conductors within said enclosure each having a first portion of its surface adapted to connect to said circuit controlling units and having at one extremity a noncircular portion and at the opposite extremity an enlarged portion, first insulating means engaging said enlarged portion to prevent longitudinal movement of said bus conductors in one direction, second insulating means also engaging said enlarged portion to prevent movement of said bus conductors in a direction opposite to that first mentioned, and third insulating means having surfaces which engage said noncircular portion of said bus conductors to prevent rotational movement thereof, and means for fixedly mounting said insulating means within said enclosure.

2. In a device for facilitating the electrical connection of circuit controlling units to a source of electrical energy, an enclosure, a plurality of elongated tubular bus conductors within said enclosure each having a first portion of its surface adapted to connect to said circuit controlling units and having one extremity noncircular in shape and the opposite extremity enlarged, first insulating means abutting against said enlarged portion of said bus conductors preventing longitudinal movement thereof in one direction, second insulating means having an aperture therein through which the bus conductors extend with the surface adjacent the aperture engaging said enlarged portion and preventing movement of said bus conductors in a direction opposite to that first mentioned, third insulating means through which said noncircular portion of said bus conductors project having surfaces which engage said noncircular portions to prevent rotational movement of said bus conductors, and means for fixedly mounting said insulating means within said enclosure.

3. In a device for facilitating the electrical connection of circuit controlling units to a source of electrical energy, a plurality of elongated bus conductors each having a first portion of its surface adapted to connect to said circuit controlling units and having in addition enlarged and noncircular portions, a metal box for housing said bus conductors, a mounting plate secured to the interior of said metal box and having a pair of spaced longitudinally extending edges projecting toward the interior of said box, an insulating wall adjacent to the enlarged portions of said bus conductors for preventing the movement thereof in one direction, a first U-shaped insulating member of sheet-like form having apertures therein of smaller diameter than that of said enlarged portions through which said bus conductors extend whereby said bus conductors are prevented from movement in a direction opposite to that first mentioned, a second U-shaped insulating member of sheet-like form having non-circular apertures therein through which said noncircular portions of said bus conductors project, said noncircular apertures fitting closely about said noncircular portions to prevent rotational movement of said bus conductors, and means for fixedly mounting said U-shaped insulating members to said longitudinally extending edges.

4. The device defined in claim 2, in which the insulating means are composed of thermalsetting phenolic impregnated cloth and formed from thin semi-cured sheets.

5. The device as defined in claim 2, in which the insulating means have a limited flexibility longitudinally of the enclosure to accommodate variations in height or positioning of circuit controlling units.

6. In a device for facilitating electrical connection of electrical controlling units to a source of electrical energy, an enclosure, an elongated bus conductor disposed within said enclosure, said bus conductor having a substantial intermediate portion of its length exposed for connection to said controlling units and having an enlarged flanged portion and a non-circular portion at opposite sides lengthwise, respectively, of said intermediate portion, a first insulating means secured to and within said enclosure and having a first surface area, a second insulating means secured to and within said enclosure and having a second surface area facing and spaced from said first surface area, said flange portion being disposed between said first and second surface areas with opposite sides thereof in juxtaposed relationship with said first and second surface areas, respectively, thereby to prevent excessive longitudinal movement of said bus conductor with respect to said enclosure, a third insulating means secured to and within said enclosure, and said third insulating means having a third surface area engaging said non-circular portion to prevent axial rotation of said bus conductor with respect to said enclosure.

References Cited in the file of this patent

UNITED STATES PATENTS

| 1,103,749 | Finkelstein | July 14, 1914 |
| 1,435,069 | Jansson | Nov. 7, 1922 |
| 1,656,856 | Gagnon | Jan. 17, 1928 |
| 2,008,288 | Malone | July 16, 1935 |
| 2,193,202 | Millermaster | Mar. 12, 1940 |
| 2,301,288 | Knauf | Nov. 10, 1942 |
| 2,322,799 | Frank | June 29, 1943 |
| 2,359,247 | Rowe | Sept. 26, 1944 |
| 2,424,528 | Wild | July 22, 1947 |
| 2,440,824 | Jackson | May 4, 1948 |
| 2,585,055 | Thomas | Feb. 12, 1952 |

FOREIGN PATENTS

| 543,278 | Great Britain | Feb. 17, 1942 |